United States Patent
Muramatsu

[19]

[11] Patent Number: 6,160,772
[45] Date of Patent: Dec. 12, 2000

[54] TILT CONTROL DEVICE FOR AN OPTICAL DISK DEVICE

[75] Inventor: Akihiro Muramatsu, Hamamatsu, Japan

[73] Assignee: Yamaha Corporation, Hamamatsu, Japan

[21] Appl. No.: 09/115,124

[22] Filed: Jul. 14, 1998

[30] Foreign Application Priority Data

Jul. 15, 1997 [JP] Japan ................................. 9-205460

[51] Int. Cl.[7] ................................................. G11B 7/00
[52] U.S. Cl. ......................................... 369/44.32; 369/54
[58] Field of Search ............................. 369/44.32, 44.14, 369/44.11, 44.17, 44.18, 44.19, 44.21, 44.27, 44.28, 54

[56] References Cited

U.S. PATENT DOCUMENTS

| | | | |
|---|---|---|---|
| 5,302,834 | 4/1994 | Murao | 369/44.32 X |
| 5,430,699 | 7/1995 | Matsubara et al. | 369/44.32 |
| 5,703,855 | 12/1997 | Kirino et al. | 369/54 |

*Primary Examiner*—Muhammad Edun
*Attorney, Agent, or Firm*—Pillsbury Madison & Sutro LLP

[57] ABSTRACT

A tilt control device for an optical disk device including a tilt error detecting section for detecting a tilt in radial tilt direction between direction of optical axis of an optical pickup at a point where the optical axis crosses an optical disk recording surface and direction perpendicular to the recording surface, a tilt actuator for driving the optical axis, a first tilt control circuit for driving the tilt actuator in accordance with a detected tilt error to correct the tilt error, a section for detecting a tilt amount from a reference position in the radial tilt direction of the tilt actuator, a section for detecting a position of the optical pickup in the radial direction of the disk, a storage section for prestoring tilt amount characteristics necessary for correcting tilt errors at respective positions in the radial direction of the disk, a second tilt control circuit for driving the tilt actuator in accordance with detection by the tilt amount detecting section for realizing a corresponding tilt amount by using, as a target value, a tilt amount given by the disk radial direction position-tilt amount characteristics at the respective positions in the radial direction of the disk, and a control section for performing a tilt control by the first tilt control circuit during recording on or reproduction and, during a search operation, performing a tilt control by the second tilt control circuit.

6 Claims, 7 Drawing Sheets

TILT CONTROL DEVICE FOR AN OPTICAL DISK DEVICE

BACKGROUND OF THE INVENTION

This invention relates to a tilt control device for an optical disk device including an optical disk recording device, an optical disk reproduction device, an optical disk recording and reproduction device and a photomagnetic disk device and, more particularly, to a tilt control device for an optical disk device capable of performing a stable tilt control during a search operation.

In an optical disk device, when a tilt exists in an optical disk, an optical axis of an objective lens of an optical pickup does not cross perpendicularly with a recording surface of the optical disk with resulting deterioration in the quality of a recorded or reproduced signal. A tilt control device is provided for correct a tilt between the optical axis of the optical pickup and direction perpendicular to the recording surface of the optical disk at a position where the optical axis of the optical pickup crosses with the recording surface. The tilt control device includes a tilt actuator which drives the optical pickup in a radial tilt direction and a tilt sensor which detects a tilt in the radial tilt direction (a tilt error) between the optical axis of the optical pickup and the direction perpendicular to the recording surface of the optical disk and constitutes a servo circuit for driving the tilt actuator so as to reduce the tilt error to zero at a recording or reproduction position.

In the tilt control device, a servo area is normally restricted to a certain narrow area for preventing response of the servo system to a surface undulation of the optical disk, i.e., a swell in the circumferential direction of the optical disk. For this reason, when a search for a desired target position on the optical disk is made by moving the optical disk at a high speed in the radial direction of the disk (i.e., a high speed search), the tilt servo cannot follow up variation in the tilt of the disk and, as a result, notwithstanding that the optical pickup has reached a zone in the vicinity of the target position, the tracking servo cannot immediately be brought into a locked state or, in the worst case, the focus servo comes out of lock, so that it sometimes requires a relatively long time before recording or reproduction at the target position is started.

It is, therefore, an object of the invention to provide a tilt control device which has eliminated the above described disadvantage of the prior art tilt control device and is capable of realizing a stable tilt control during a high speed search.

SUMMARY OF THE INVENTION

For achieving the above described object of the invention, there is provided a tilt control device for an optical disk device comprising a tilt error detecting section for detecting a tilt in radial tilt direction between direction of optical axis of an optical pickup at a point where the optical axis crosses with optical disk recording surface and direction perpendicular to the optical disk recording surface, a tilt actuator for driving the optical axis of the optical pickup in the radial tilt direction, a first tilt control circuit for driving the tilt actuator in accordance with a detected tilt error to correct the tilt error, a tilt amount detecting section for detecting a tilt amount from a reference position in the radial tilt direction of the tilt actuator, an optical pickup radial direction position detecting section for detecting a position of the optical pickup in the radial direction of the disk, a disk radial direction position-tilt amount characteristic storage section for prestoring tilt amount characteristics necessary for correcting tilt errors at respective positions in the radial direction of the disk, a second tilt control circuit for driving the tilt actuator in accordance with detection by the tilt amount detecting section for realizing a corresponding tilt amount by using, as a target value, a tilt amount given by the disk radial direction position-tilt amount characteristics at the respective positions in the radial direction of the disk, and a control section for performing a tilt control by the first tilt control circuit during recording on or reproduction from the optical disk and, during a search operation for searching a desired position on the optical disk, performing a tilt control by the second tilt control circuit instead of the tilt control by the first tilt control circuit.

According to the invention, tilt amount characteristics necessary for correcting tilt errors at respective positions in the radial direction of the disk (i.e., disk radial direction-tilt amount characteristics) are prestored and, during a search operation, a tilt control (a tilt control by the second tilt control circuit) is performed in accordance with the disk radial direction position-tilt amount characteristics instead of a normal tilt servo (a tilt control by the first tilt control circuit). By this arrangement, even when the optical pickup is moved at a high speed in the radial direction of the disk, the tilt actuator can be driven while following up variation in the tilt of the disk whereby the optical pickup can reach the target position with a tilt error being substantially eliminated. Accordingly, the tracking servo can be immediately brought into a locked state in the vicinity of the target position so that recording or reproduction can be started from the target position without delay.

For obtaining the disk radial direction position-tilt amount characteristics, characteristics of a tilt error signal relative to a tilt amount in a case where a reference disk in which there is no tilt existing between direction of an axis of rotation of the disk and direction perpendicular to a recording surface of the disk (i.e., tilt amount-tilt error signal characteristics) may be prestored and, characteristics of tilt amount necessary for correcting a tilt error at respective positions in the radial direction of the disk may be obtained in accordance with tilt error signals which are detected at respective positions in the radial direction of the disk when the optical pickup is moved in the radial direction of the disk with the optical disk on which recording or reproduction is made being loaded in the optical disk device and with the tilt actuator being held at the reference position and in accordance with the tilt amount-tilt error signal characteristics and these characteristics may be used as the disk radial direction position-tilt amount characteristics.

In this case, for obtaining the tilt amount-tilt error signal characteristics, the tilt actuator may be driven compulsorily within a predetermined tilt range with the reference disk being loaded in the optical disk device and with the optical pickup being held at a predetermined position in the radial direction of the disk and the tilt amount-tilt error signal characteristics may be computed in accordance with tilt error signals detected at this time by the tilt error detecting section.

As an alternative method for obtaining the disk radial direction position-tilt amount characteristics, characteristics of tilt amounts detected at respective positions in the radial direction of the disk when the optical pickup is moved in the radial direction of the disk at a speed at which a servo control by the first tilt control circuit can follow up a tilt of the optical disk with the optical disk on which recording or reproduction is made is loaded in the optical disk device and with the first tilt control circuit being in an operation mode may be used the disk radial direction position-tilt error signal characteristics. According to this arrangement, it is not necessary to obtain the tilt amount-tilt error signal characteristics and, therefore, the disk radial director position-tilt amount characteristics can be easily obtained.

Preferred embodiments of the invention will be described below with reference to the accompanying drawings.

BRIEF DESCRIPTION OF THE DRAWINGS

In the accompanying drawings,

FIGS. 2A to 2C are views showing a specific example of a tilt actuator and a tilt amount detecting section of FIGS. 1 and 6 in which FIG. 2B is a view of the tilt actuator as viewed in the direction of arrow A in FIG. 1 and FIG. 2C is a view of the tilt amount detecting section as viewed in the direction of arrow A in FIG. 1;

FIGS. 3A and 3B are views showing another example of the tilt actuator and the tilt amount detecting section of FIGS. 1 and 6 in which FIG. 2B is a view taken in the direction of arrow B in FIG. 3;

DESCRIPTION OF PREFERRED EMBODIMENTS

Figure 1:
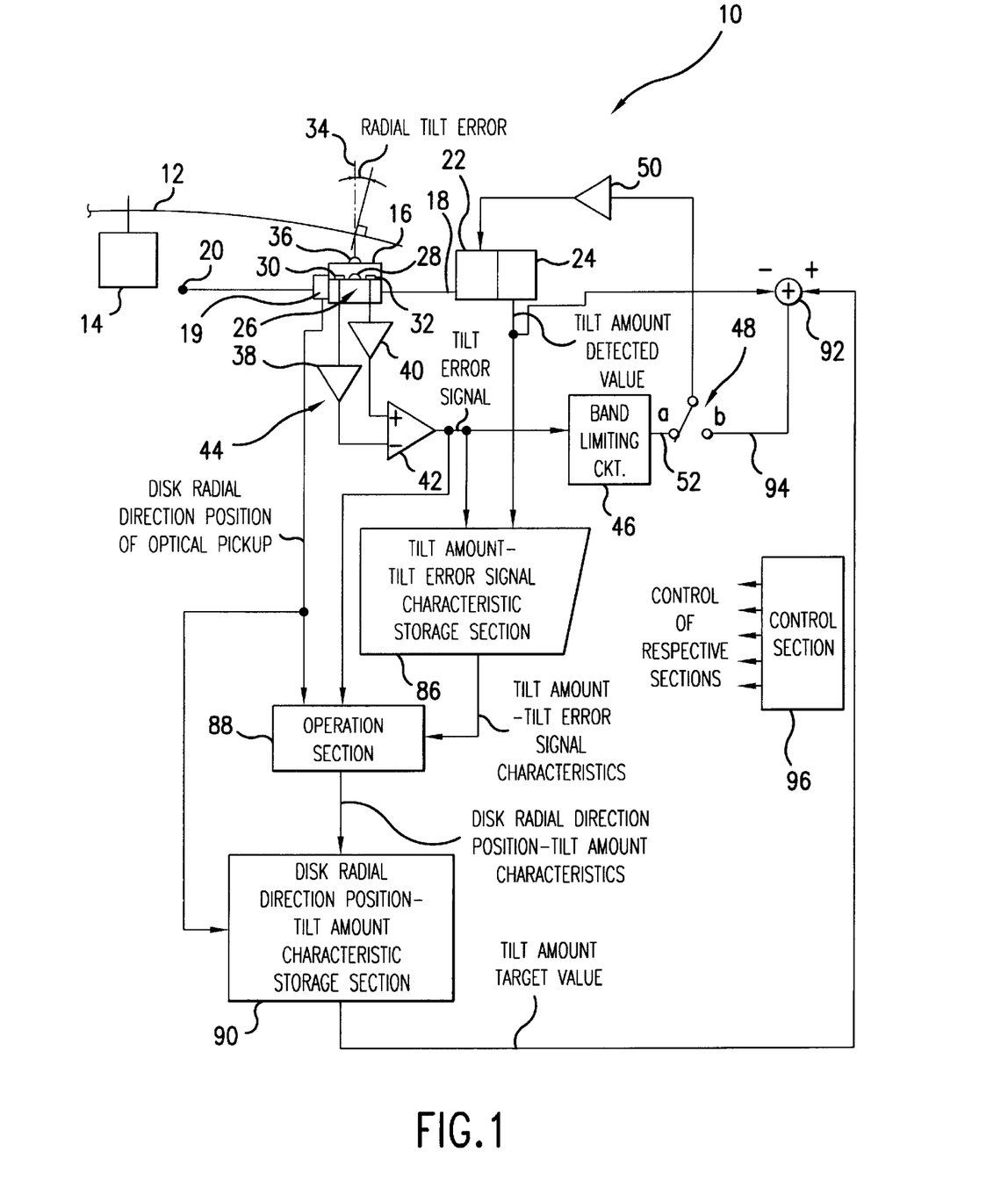
FIG. 1 is a block diagram showing an embodiment of the invention.

FIG. 1 shows an embodiment of the present invention. In an optical disk device 10, an optical disk pickup 12 is driven and rotated by a spindle motor 14 and recording and reproduction of information is made by an optical pickup 16. The optical pickup 16 is supported by a guide rail 18 in such a manner that it is slidable in the radial direction of the optical disk 12 and is moved in the radial direction of the disk 12 along the guide rail 18 by a feed motor (not shown). A position of the optical pickup 16 in the radial direction of the disk 12 is detected by an optical pickup radial direction position detection section 19. The guide rail 18 is supported pivotably in vertical direction (i.e., direction perpendicular to the recording surface of the optical disk 12) about a pivot 20 at the end the guide rail 18 on the side of the center of the disk 12. The guide rail 18 is pivoted vertically about the pivot 20 by a tilt actuator 22 to perform a tilting operation. A tilt amount detecting section 24 detects, as a tilt amount, an amount of tilt in the vertical direction of the guide rail 18 from a reference position at which the guide rail 18 assumes a horizontal posture (i.e., the guide rail 18 crosses the axis of rotation of the optical disk 12 at right angles). An optical axis 34 of the optical pickup 16 (optical axis of an objective lens 36) is set in such a manner that it is directed in a perpendicular direction (i.e., direction parallel to the axis of rotation of the spindle motor 14) when the tilt amount is one at the reference position.

A tilt sensor 26 is mounted on the optical pickup 16. The tile sensor 26 is composed, e.g., of a light emitting diode 28 and a pair of photo diodes 30 and 32 disposed on both sides of the light emitting diode 28 in the radial direction of the disk 12. The optical axis of the light emitting diode 28 is parallel with the optical axis 34 of the optical pickup 16 and is disposed at a position which is of the same distance as the optical a axis 34 in the radial direction of the disk 12 and is slightly offset from the optical axis 34 in the circumferential direction of the disk 12. The photo diodes 30 and 32 are disposed with their light receiving surfaces facing in the vertical direction and with their optical axes being parallel to the optical axis of the light emitting diode 28. Light emitted from the light emitting diode 28 is reflected by the recording surface of the optical disk 12 and received by the photo diodes 30 and 32. When the optical axis of the light emitting diode 28 crosses the recording surface of the optical disk 12 at right angles, output current values of the photo diodes 30 and 32 are equal to each other and, when a tilt in the radial direction of the disk 12 (radial tilt error) is produced, difference is produced between the output current values of the photo diodes 30 and 32, the magnitude of the difference depending upon direction and magnitude of the tilt.

The output current values of the photo diodes 30 and 32 are converted to voltage signals by current/voltage converting circuits 38 and 40 and a difference signal between the voltage signals is provided as a tilt error signal from a radial tilt error amplifier (subtractor) 42. The tilt sensor 26, current/voltage converting circuits 38 and 40 and radial tilt error amplifier 42 constitute a tilt error detecting section 44.

High frequency components of the tilt error signal are eliminated by a band limiting circuit 46 for preventing response of the tilt servo to a surface undulation of the optical disk 12. The tilt error signal provided from the band limiting circuit 46 is applied to the tilt actuator 22 through a contact a of an analog switch 48 and a driver 50 to drive the tilt actuator 22 so as to reduce t the radial tilt error to zero. The above described control system performing a tilt control on real time (normal tilt servo) on the basis of detection by the tilt sensor 26 constitutes a first tilt control circuit 52.

Figure 2A:
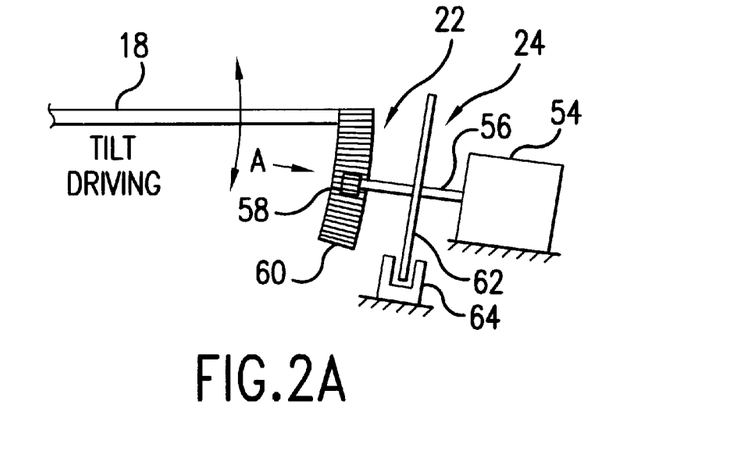
Figure 2B:
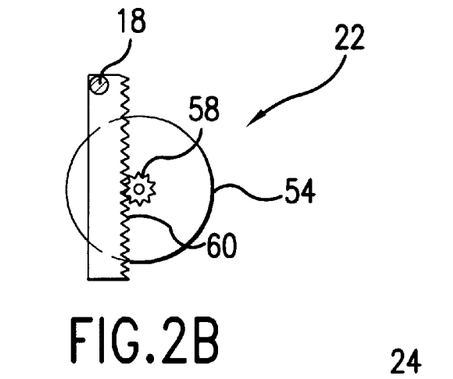
Figure 2C:
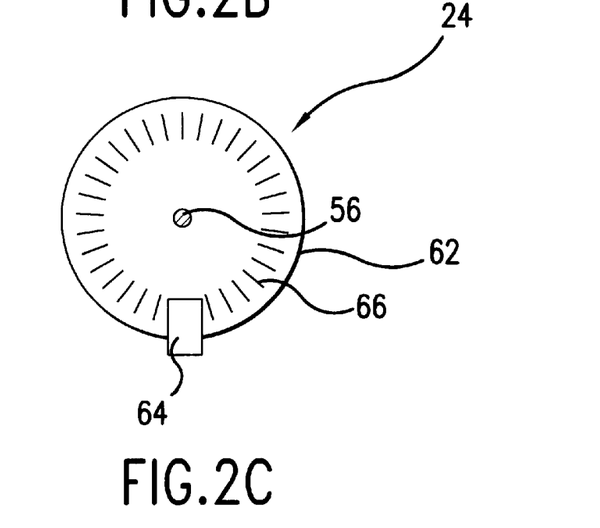

A specific example of the tilt actuator 22 and the tilt amount detecting section 24 is shown in FIGS. 2A to 2C. The tilt actuator 22 is composed of a tilt motor 54, a pinion 58 mounted on a drive shaft 56 of the tilt motor 54 and a rack 60 mounted on the end portion of the guide rail 18 in a manner to extend in the vertical direction. When the tilt motor 54 is driven, the driving force is transmitted to the guide rail 18 through the pinion 58 and the rack 60 and the guide rail 18 is thereby pivoted in the vertical direction about the pivot 20 (FIG. 1) and the optical axis 34 of the optical pickup 16 is driven in the radial tilt direction.

A tilt amount detecting section 24 is composed of a rotary disk 62 mounted on the drive shaft 56 and a sensor section 64. The rotary disk 62 is formed in its outer peripheral portion with radially extending slits 66 (or reflecting portions) provided at an equal interval. The sensor section 64 is disposed opposite to the slits 66 (or reflecting portions) to optically detect the slits 66 (or reflecting portions). The rotary disk 62 is also formed with a slit (or a reflecting portion) at a reference position in the circumferential direction corresponding to the reference position of the tilt amount. The reference position of the tilt amount is detected by detecting this slit at the reference position by the sensor section 64. By counting the number of the passing slits 66 from the reference position of the tilt amount on the basis of the output of the sensor 64, the tilt amount is obtained (illustration of a processing circuit including a counter is omitted).

Figure 3A:
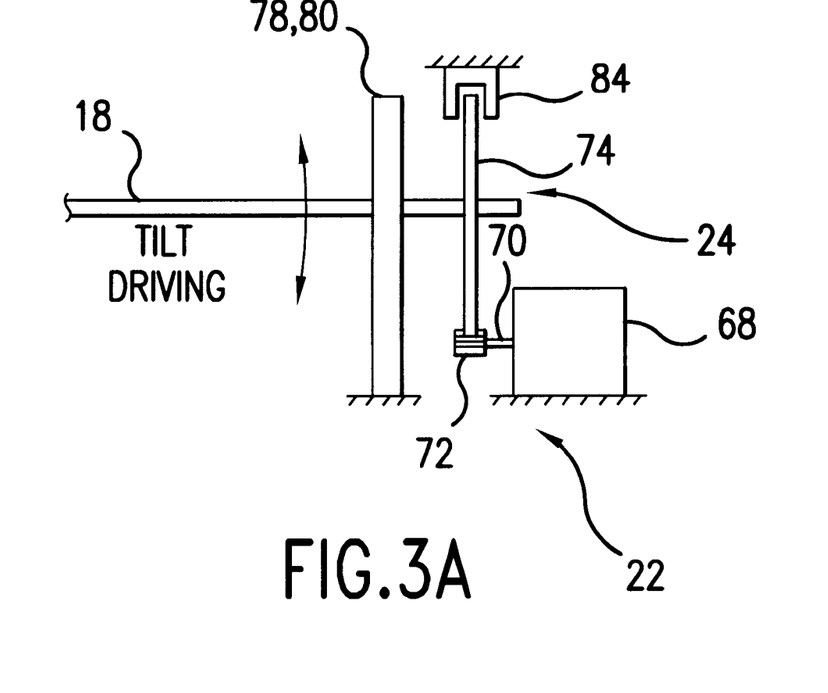
Figure 3B:
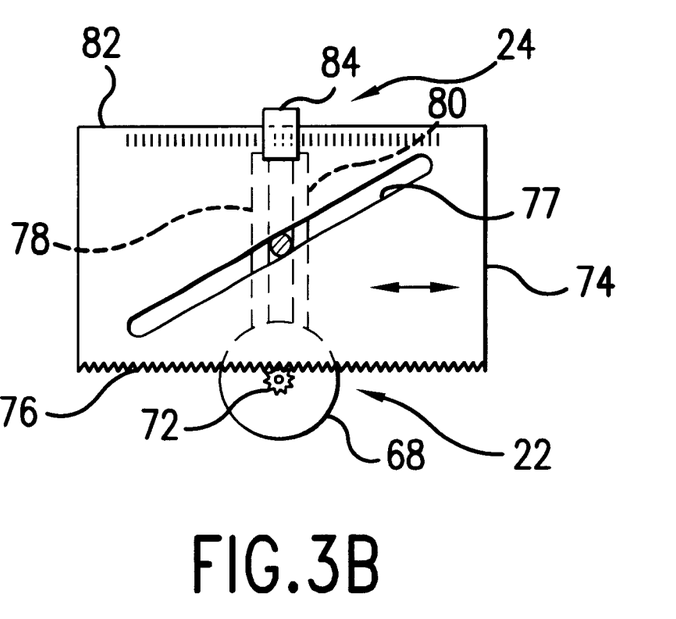

Another specific example of the tilt actuator 22 and the tilt amount detecting section 24 is shown in FIGS. 3A and 3B. The tilt actuator 22 includes a tilt motor 68, a pinion 72 mounted on the shaft of the tilt motor 68 and a slide plate 74 which is slidable in horizontal direction which crosses the guide rail 18 at right angles. A rack 76 is formed on the lower surface of the slide plate 74 which is in meshing engagement with the pinion 72. The slide plate 74 is formed with a slit 77 extending obliquely in which the foremost end portion of the guide rail 18 is slidably inserted. The guide rail 18 is restricted in its lateral movement by a pair of guide members 78 and 80 disposed at both end portion of the guide rail 18 and, therefore, the guide rail 18 can only move in a vertical pivotal motion. By this arrangement, as the tilt motor 68 is driven, the slide plate 74 slides in the horizontal direction and the guide rail 18 is pivoted in the vertical direction about the pivot 20 whereby the tilt operation is realized.

The slide plate 74 is formed in its upper edge portion with slits 82 (or reflecting portions) and a sensor section 84 is provided in correspondence to these slits 82. The sensor section 84 optically detects the slits 82 (or reflecting portions). The slide plate 74 is also formed with a slit (or a reflecting portion) at a reference position in horizontal direction corresponding to the reference position of the tilt amount. By detecting this slit by the sensor section 84, the reference position of the tilt amount is detected. By counting the number of passing slits 82 from the reference position of the tilt amount (illustration of a processing circuit including a counter is omitted) on the basis of the output of the sensor section 84, the tilt amount can be obtained. As the tilt amount detecting section 24, not only a circuit which detects the tilt amount optically, but a circuit which detects the tilt amount magnetically, electrostatically or mechanical may also be employed.

In FIG. 1, a tilt amount-tilt error signal characteristic storage section 86 prestores characteristics of tilt error signals relative to the tilt amount obtained in a case where a reference disk in which a tilt between direction of the axis of rotation of the disk and direction perpendicular to the recording surface of the disk is used. These characteristics can be obtained by detecting the level of tilt error signals provided by the tilt error detecting section 44 when, before recording on or reproduction from an optical disk 12, the tilt actuator 22 is moved compulsorily in the radial direction of the disk 12 within a predetermined tilt amount range with the reference disk being loaded in the optical disk device 10 and with the optical pickup 16 being held at a predetermined position in the radial direction of the disk 12.

An operation section 88 provides disk radial direction position-tilt amount characteristics which are characteristics of tilt amount necessary for correcting tilt errors at respective positions in the radial direction of the disk 12. More specifically, the operation section 88 computes characteristics of the tilt amount necessary for correcting tilt errors at respective positions in the radial direction of the disk 12 in accordance with tilt error signals which are detected at the respective positions in the radial direction of the disk 12 when the optical pickup 16 is moved in the radial direction of the disk 12 with the optical disk 12 on which recording or reproduction is to be made being loaded in the optical disk device 10 and with the tilt actuator 22 being held at the reference position, and in accordance with the tilt amount-tilt error signal characteristics (the characteristics may also be obtained as linear proximate or curve proximate characteristics). The obtained disk radial direction position-tilt amount characteristics are stored in a disk radial direction position-tilt amount storage section 90.

When the analog switch 48 is connected to the contact b, a tilt amount is read from the disk radial direction-tilt amount characteristic storage section 90 depending upon a disk radial direction position detected by the optical pickup radial direction detecting section 19. By using this ti it amount as a target value, difference between this target value and a tilt amount detected by the tilt amount detecting section 24 is computed at an addition point 92 and the tilt actuator 22 is driven through a driver 50 so as to reduce this difference to zero. The control system performing the tilt control on the basis of the disk radial direction position-tilt amount characteristics constitutes a second tilt control circuit 94.

Figure 4:
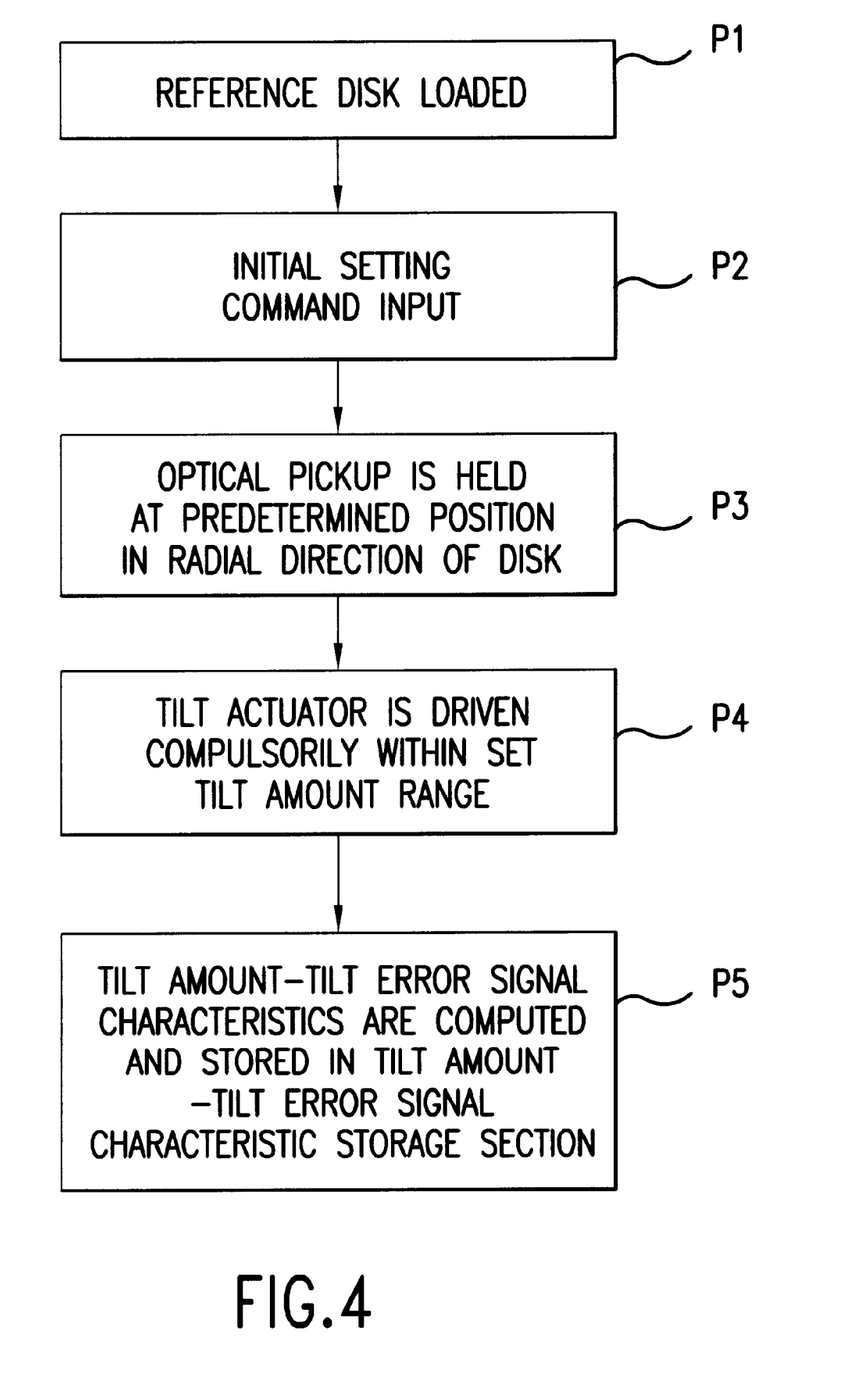
FIG. 4 is a flow chart showing a routine of initial setting for obtaining and storing the tilt amount-tilt error signal characteristics by a control section 96 of FIG. 1.
Figure 6:
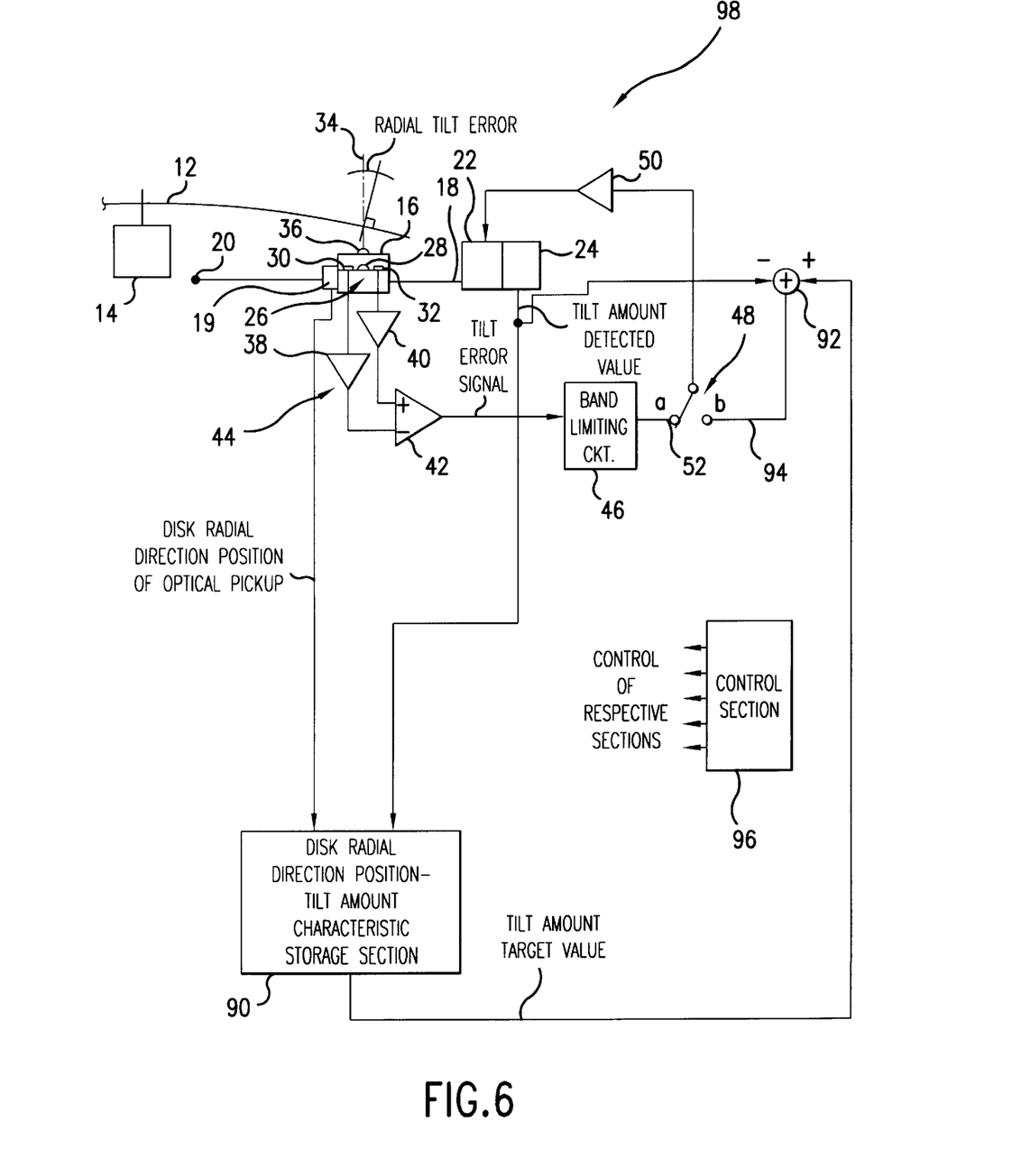
FIG. 6 is a block diagram showing another embodiment of the invention.

A control section 96 performs control of the respective sections of the tilt control device. Contents of the control by the control section 96 are shown in FIGS. 4 and 6. FIG. 4 shows a routine of an initial setting for computing and storing the tilt amount-tilt error signal characteristics. As a reference disk is loaded (P1) and an initial setting command is given by a key operation or the like (P2), the optical pickup 16 is held at a predetermined position in the radial direction of the disk 12 (P3). In this state, the tilt actuator 22 is compulsorily driven within a predetermined range (P4). Tilt amount-tilt error signal characteristics are computed on the basis of levels of tilt error signals detected by the tilt error detecting section 44 and tilt amounts detected by the tilt amount detecting section 24 and stored in the tilt amount-tilt error signal characteristic storage section 86 (P5).

Figure 5:
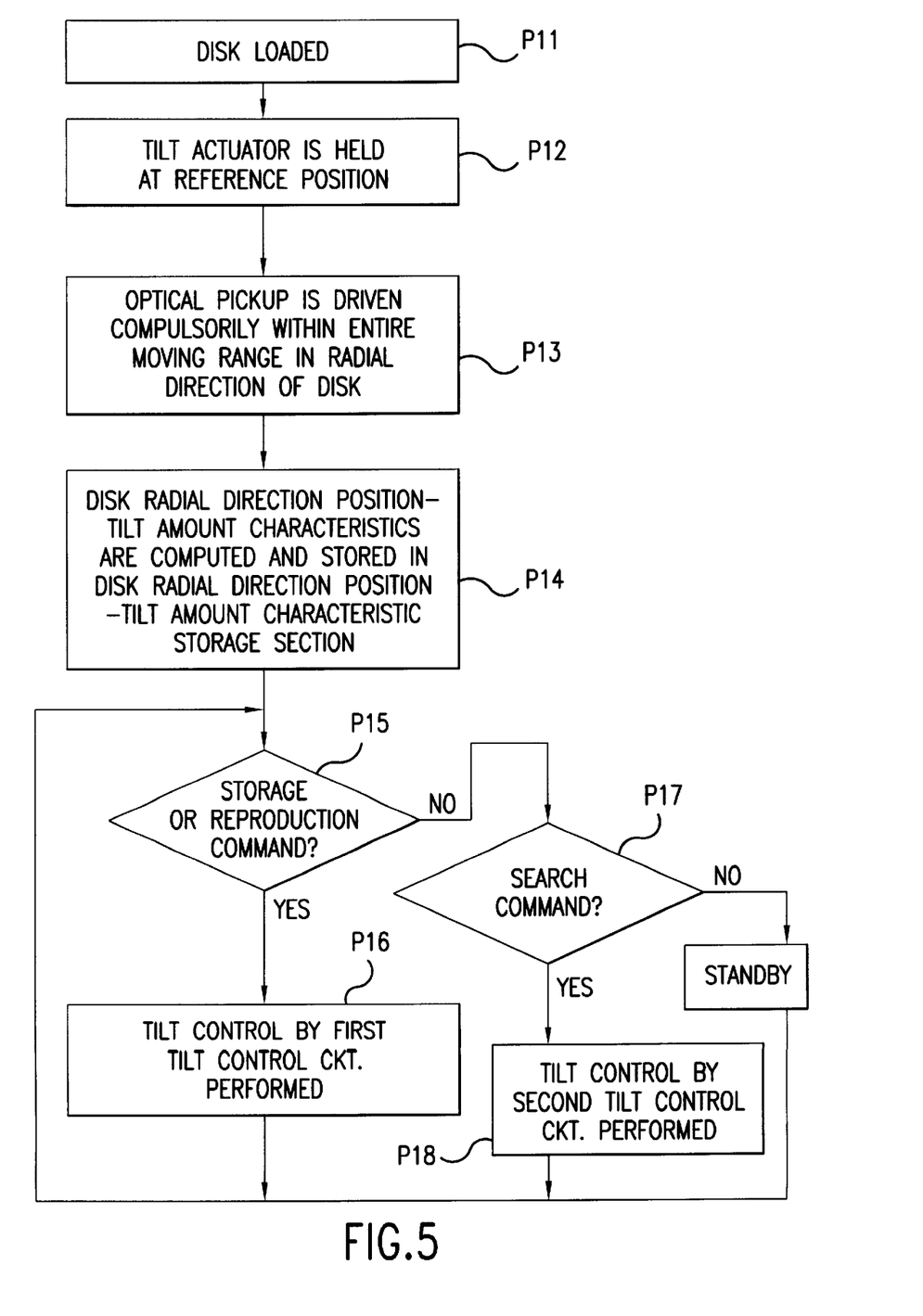
FIG. 5 is a flow chart showing contents of a tilt control performed when information is recorded on or reproduced from an optical disk or a search operation is made for obtaining the disk radial direction position-tilt amount characteristics.

FIG. 5 shows contents of the tilt control performed when recording or reproduction of information is made or a designated position is searched on the optical disk 12 on which recording or reproduction is to be made. As the optical disk 12 is loaded (P11), the tilt actuator 22 is held at the reference position (position at which the extending direction of the guide rail 18 crosses the axis of rotation of the spindle motor 14 at right angles) (P12) and the optical pickup 16 is moved compulsorily over the entire moving range in the radial direction of the disk 12 (P13). The operation section 88 computes disk radial direction position-tilt amount characteristics on the basis of tilt error signals detected at respective positions in the radial direction of the disk 12 and the tilt amount-error signal characteristics and these characteristics are stored in the disk radial direction position-tilt amount characteristic storage section 90 (P14). Then, when recording or reproduction command is given (P15), the analog switch 48 is connected to the contact a and the tilt control by the first tilt control circuit 52 is performed (P16). When a search command for searching a desired position on the recording surface is given (P17), the analog switch 48 is connected to the contact b and the tilt control by the second tilt control circuit 94 is performed (P18).

By this arrangement, even when a search operation is made at a high speed, the optical pickup 16 can be moved following up variation in the tilt of the optical disk 12 whereby the optical pickup 16 can reach a target position with a tilt error being substantially eliminated.

FIG. 6 shows another embodiment of the invention. The same components as those shown in FIG. 1 are designated by the same reference characters. In this embodiment, tilt amount characteristics (disk radial direction position-tilt amount characteristics) detected at respective positions in the radial direction of the optical disk 12 when the optical pickup 16 is moved in the radial direction of the disk 12 at a speed at which a servo control performed by the first tilt control circuit 52 can follow up a tilt of the optical disk 12 with the optical disk 12 on which recording or reproduction is to be made is loaded in the optical disk device 10 and with the first tilt control circuit 52 being in an operation mode by connecting the analog switch 48 to the contact a are stored in the disk radial direction position-tilt amount characteristic storage section 90.

Figure 7:
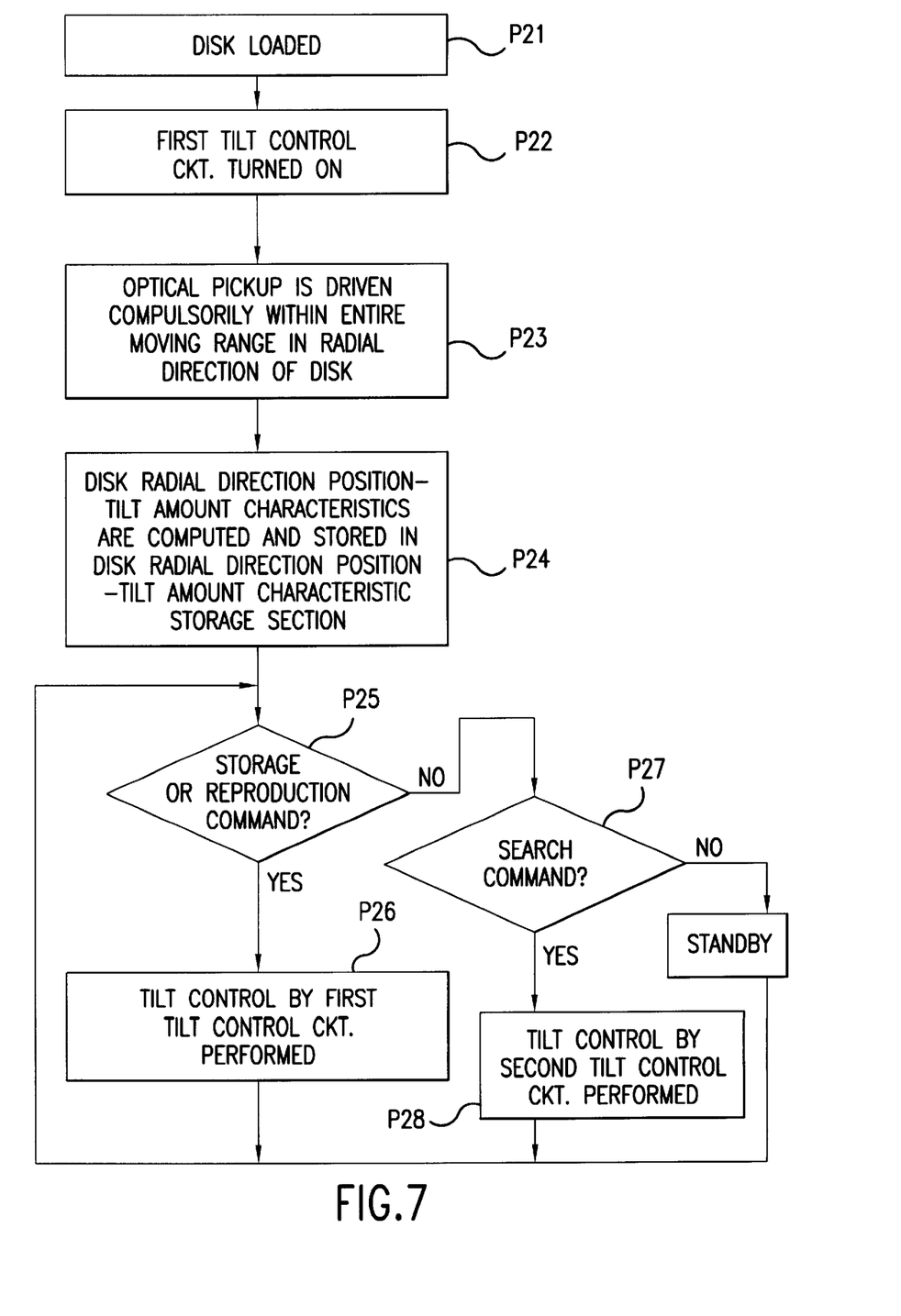
FIG. 7 is a flow chart showing contents of a tilt control performed by the control section 96 when information is recorded on or reproduced from an optical disk or a search operation is made for obtaining the disk radial direction position-tilt amount characteristics.

Contents of the control by the control section 96 are shown in FIG. 7. Before recording or reproduction on the optical disk 12, the optical disk 12 is loaded (P21) and the first tilt control circuit 52 is turned on by connecting the analog switch 48 to the contact a (P22). In this state, the optical pickup 16 is moved compulsorily over substantially the entire moving range in the radial direction of the disk 12 (P23). Characteristics detected at respective positions in the radial direction of the disk 12 are stored in the disk radial direction position-tilt amount characteristics storage section 90 (P24). During recording or reproduction on the disk 12 (P25), the tilt control by the first tilt control circuit 52 is performed (P26). During a search operation for searching a desired position on the recording surface of the disk 12 (P27), the analog switch 48 is connected to the contact b and the tilt control by the second tilt control circuit 94 is thereby performed.

By this arrangement, even if a search operation is made at a high speed, the optical pickup 16 can be moved following up variation in the tilt of the optical disk 12 whereby the optical pickup 16 can reach a target position with a tilt error being substantially eliminated.

In the tilt control made by the second control circuit 94 in the embodiments of FIGS. 1 and 6, in response to disk radial direction positions which are sequentially read out during a search operation, corresponding tilt amounts are sequentially read from the disk radial direction position-tilt amount characteristic storage section 90 to drive the tilt actuator 22 (i.e., the control is made so that the tilt error is reduced to zero during the entire period of the search operation). Alternatively, a disk radial direction position of a target position may be detected, a tilt amount at the target position may be read out on the basis of a disk radial direction position-tilt amount characteristic at the disk radial direction position of the target position and the tilt actuator 22 may be driven by using this tilt amount fixedly as a target value. In other words, according to this alternative method, the control is made in such a manner that a tilt error takes place at a middle point of the search operation but the tilt error is reduced to zero at the target position.

What is claimed is:

1. A tilt control device for an optical disk device comprising:

a tilt error detecting section that detects a tilt in radial tilt direction between direction of optical axis of an optical pickup at a point where the optical axis crosses an optical disk recording surface and direction perpendicular to the optical disk recording surface;

a tilt actuator that drives the optical axis of the optical pickup in the radial tilt direction;

a first tilt control circuit that drives the tilt actuator in accordance with a detected tilt error to correct the tilt error;

a tilt amount detecting section that detects a tilt amount from a reference position in the radial tilt direction of the tilt actuator;

an optical pickup radial direction position detecting section that detects a position of the optical pickup in the radial direction of the disk;

a disk radial direction position-tilt amount characteristic storage section that prestores tilt amount characteristics necessary for correcting tilt errors at respective positions in the radial direction of the disk;

a second tilt control circuit that drives the tilt actuator in accordance with detection by the tilt amount detecting section that realizes a corresponding tilt amount by using, as a target value, a tilt amount given by the disk radial direction position-tilt amount characteristics at the respective positions in the radial direction of the disk; and a control section that performs a tilt control by the first tilt control circuit during recording on or reproduction from the optical disk and, during a search operation for searching a desired position on the optical disk, performs a tilt control by the second tilt control circuit instead of the tilt control by the first tilt control circuit.

2. A tilt control device for an optical disk device comprising:

a tilt error detecting section that detects a tilt in radial tilt direction between direction of optical axis of an optical pickup at a point where the optical axis crosses an optical disk recording surface and direction perpendicular to the optical disk recording surface;

a tilt actuator that drives the optical axis of the optical pickup in the radial tilt direction;

a first tilt control circuit that drives the tilt actuator in accordance with a detected tilt error to correct the tilt error;

a tilt amount detecting section that detects a tilt amount from a reference position in the radial tilt direction of the tilt actuator;

a tilt amount-tilt error signal characteristic storage section that prestores characteristic of the tilt error signal relative to a tilt amount in a case where a reference disk in which there is no tilt existing between direction of an axis of rotation of the disk and direction perpendicular to a recording surface of the disk is used;

an optical pickup radial direction position detecting section that detects a position of the optical pickup in the radial direction of the disk;

an operation section which, when an optical disk on which recording or reproduction is to be made is loaded in the optical disk device, the tilt actuator is held at the reference position, and the optical pickup is moved in the radial direction of the disk, obtains a tilt amount characteristic necessary for correcting a tilt error at respective positions in the radial direction of the disk in accordance with the tilt error signals detected at the respective positions in the radial direction of the disk and the tilt amount-tilt error signal characteristics;

a disk radial direction position-tilt amount characteristic storage section that stores the disk radial direction position-tilt amount characteristics obtained by the operation section;

a second tilt control circuit that drives the tilt actuator in accordance with detection by the tilt amount detecting section for realizing a corresponding tilt amount by using, as a target value, a tilt amount given by the disk radial direction position-tilt amount characteristics at the respective positions in the radial direction of the disk; and a control section which, before recording on or reproduction from the optical disk, causes the optical pickup to be moved compulsorily substantially over an entire moving range of the optical pickup in the radial direction of the disk with the optical disk being loaded in the optical disk device and with the tilt actuator being held at the reference position, causes the disk radial direction position-tilt amount characteristics to be obtained by the operation section in accordance with tilt error signals detected at respective positions in the radial direction of the disk and the tilt amount-tilt error signal characteristics and causes the obtained characteristics to be stored in the disk radial direction position-tilt amount characteristic storage section, performs a tilt control by the first control circuit during recording on or reproduction from the optical disk and, during a search operation for searching a desired position on the optical disk, performs a tilt control by the second tilt control circuit instead of the tilt control by the first tilt control circuit.

3. A tilt control device for an optical disk device as defined in claim 2 wherein said control circuit, before recording on or reproduction from the optical disk, causes the tilt actuator to be moved compulsorily within a predetermined tilt amount range with the reference disk being loaded in the optical disk device and the optical pickup being held at a predetermined position in the radial direction of the disk, causes the tilt amount-tilt error signal characteristics to be obtained in accordance with tilt error signals detected by the tilt error detecting section and causes the tilt amount-tilt error signal characteristics to be stored in the tilt amount-tilt error signal characteristic storage section.

4. A tilt control device for an optical disk device comprising:

a tilt error detecting section that detects a tilt in radial tilt direction between direction of optical axis of an optical pickup at a point where the optical axis crosses an optical disk recording surface and direction perpendicular to the optical disk recording surface;

a tilt actuator that drives the optical axis of the optical pickup in the radial tilt direction;

a first tilt control circuit that drives the tilt actuator in accordance with a detected tilt error to correct the tilt error;

a tilt amount detecting section that detects a tilt amount from a reference position in the radial tilt direction of the tilt actuator;

an optical pickup radial direction position detecting section that detects a position of the optical pickup in the radial direction of the disk;

a disk radial direction position-tilt amount characteristic storage section that stores tilt amount characteristics detected at respective positions in the radial direction of the disk when the optical pickup is moved in the radial direction of the disk at a speed at which a servo control performed by the first tilt control circuit can follow up a tilt of the optical disk with the optical disk on which recording or reproduction is to be made is loaded in the optical disk device and with the first tilt control circuit being in an operation mode;

a second tilt control circuit that drives the tilt actuator in accordance with detection by the tilt amount detecting section for realizing a corresponding tilt amount by using, as a target value, a tilt amount given by the disk radial direction position-tilt amount characteristics at the respective positions in the radial direction of the disk; and a control section which, before recording on or reproduction from the optical disk, causes the optical pickup to be moved compulsorily substantially over an entire moving range of the optical pickup in the radial direction of the disk with the optical disk being loaded in the optical disk device and with the first tilt control circuit being in the operation mode, causes characteristics of tilt amounts detected at respective positions in the radial direction of the disk to be stored in the disk radial direction position-tilt amount characteristic storage section, performs a tilt control by the first tilt control circuit during recording on or reproduction from the optical disk and, during a search operation for searching a desired position on the optical disk, performs a tilt control by the second tilt control circuit instead of the tilt control by the first tilt control circuit.

5. A tilt control device for an optical disk device comprising:

tilt error detecting means for detecting a tilt in radial tilt direction between direction of optical axis of an optical pickup at a point where the optical axis crosses an optical disk recording surface and direction perpendicular to the optical disk recording surface;

a tilt actuator for driving the optical axis of the optical pickup in the radial tilt direction;

a first tilt control circuit for driving the tilt actuator in accordance with a detected tilt error to correct the tilt error;

tilt amount detecting means for detecting a tilt amount from a reference position in the radial tilt direction of the tilt actuator;

optical pickup radial direction position detecting means for detecting a position of the optical pickup in the radial direction of the disk;

disk radial direction position-tilt amount characteristic storage means for prestoring tilt amount characteristics necessary for correcting tilt errors at respective positions in the radial direction of the disk;

a second tilt control circuit for driving the tilt actuator in accordance with detection by the tilt amount detecting means for realizing a corresponding tilt amount by using, as a target value, a tilt amount given by the disk radial direction position-tilt amount characteristics at the respective positions in the radial direction of the disk; and control means for performing a tilt control by the first tilt control circuit during recording on or reproduction from the optical disk and, during a search operation for searching a desired position on the optical disk, performing a tilt control by the second tilt control circuit instead of the tilt control by the first tilt control circuit.

6. A tilt control method for an optical disk device comprising steps of:

detecting a tilt in radial tilt direction between direction of optical axis of an optical pickup at a point where the optical axis crosses an optical disk recording surface and direction perpendicular to the optical disk recording surface;

detecting a tilt amount from a reference position in the radial tilt direction of the tilt actuator;

detecting a position of the optical pickup in the radial direction of the disk;

prestoring tilt amount characteristics necessary for correcting tilt errors at respective positions in the radial direction of the disk;

driving, during recording on or reproduction from the optical disk, a tilt actuator for driving the optical axis of the optical pickup in the radial direction in accordance with a detected tilt error to correct the tilt error; and driving, during a search operation for searching a desired position on the optical disk, the tilt actuator in accordance with a detected tilt amount for realizing a corresponding tilt amount by using, as a target value, a tilt amount given by the disk radial direction position-tilt amount characteristics at the respective positions in the radial direction of the disk.

* * * * *